United States Patent
Hartmann

(10) Patent No.: US 12,122,615 B2
(45) Date of Patent: Oct. 22, 2024

(54) INSERT FEED UNIT AS WELL AS A METHOD FOR ITS OPERATION

(71) Applicant: MULTIVAC SEPP HAGGENMUELLER SE & CO. KG, Wolfertschwenden (DE)

(72) Inventor: Albert Hartmann, Dietmannsried (DE)

(73) Assignee: MULTIVAC Sepp Haggenmueller SE & Co. KG, Wolfertschwenden (DE)

( * ) Notice: Subject to any disclaimer, the term of this patent is extended or adjusted under 35 U.S.C. 154(b) by 232 days.

(21) Appl. No.: 17/850,944

(22) Filed: Jun. 27, 2022

(65) Prior Publication Data
US 2022/0411203 A1    Dec. 29, 2022

(30) Foreign Application Priority Data
Jun. 28, 2021    (DE) .......................... 102021116619.5

(51) Int. Cl.
B65G 47/57    (2006.01)
B26D 7/06    (2006.01)
B26D 7/32    (2006.01)
B65G 47/84    (2006.01)

(52) U.S. Cl.
CPC ......... B65G 47/841 (2013.01); B26D 7/0625 (2013.01); B26D 7/32 (2013.01); B65G 47/57 (2013.01); *B26D 2210/02* (2013.01); *B65G 2201/0202* (2013.01)

(58) Field of Classification Search
CPC .................. B65G 47/57; B65G 47/841; B65G 2201/0202; B26D 7/32; B26D 7/0625; B26D 2210/02

USPC ......................................................... 198/800
See application file for complete search history.

(56) References Cited

U.S. PATENT DOCUMENTS

| 3,184,032 | A | * | 5/1965 | Jonsson | B65G 47/57 198/801 |
| 3,268,055 | A | * | 8/1966 | Stein | A43D 95/12 198/572 |
| 6,945,380 | B2 | * | 9/2005 | Sauer | B65G 47/50 198/346.2 |
| 7,073,657 | B2 | * | 7/2006 | Langenegger | F26B 15/10 198/460.1 |
| 8,162,127 | B2 | * | 4/2012 | Humele | B65G 47/5122 198/347.1 |
| 10,144,595 | B2 | * | 12/2018 | Philipp | B65G 47/57 |
| 11,297,777 | B2 | * | 4/2022 | Oberthier | A01G 31/042 |

FOREIGN PATENT DOCUMENTS

| DE | 43 03 413 A1 | 8/1994 | |
| DE | 10 2014 117 392 A1 | 6/2016 | |
| EP | 2008953 A1 * | 12/2008 | ......... B65G 47/5113 |

OTHER PUBLICATIONS

WO 2014/191162 A1, Siemens, Apr. 12, 2014.*
German Search Report Dated Mar. 3, 2022, Application No. 10 2021 116 619.5, Applicant Multivac Sepp Haggenmueller SE & Co. Kg., 8 Pages.

* cited by examiner

Primary Examiner — Douglas A Hess
(74) Attorney, Agent, or Firm — Brooks Kushman P.C.

(57) ABSTRACT

In order to keep the overall length of an insertion feed unit small despite high variability, a vertical paternoster buffer is used as a buffer therein.

19 Claims, 4 Drawing Sheets

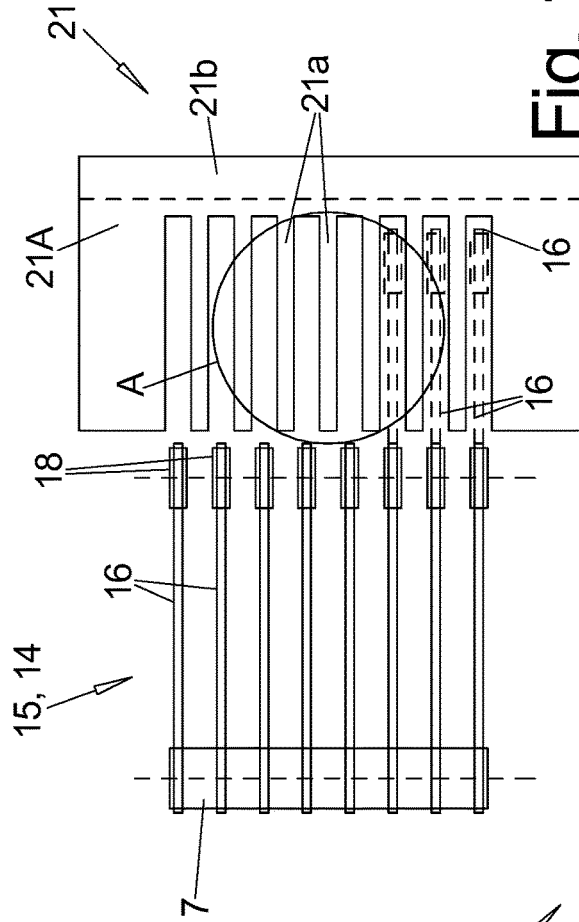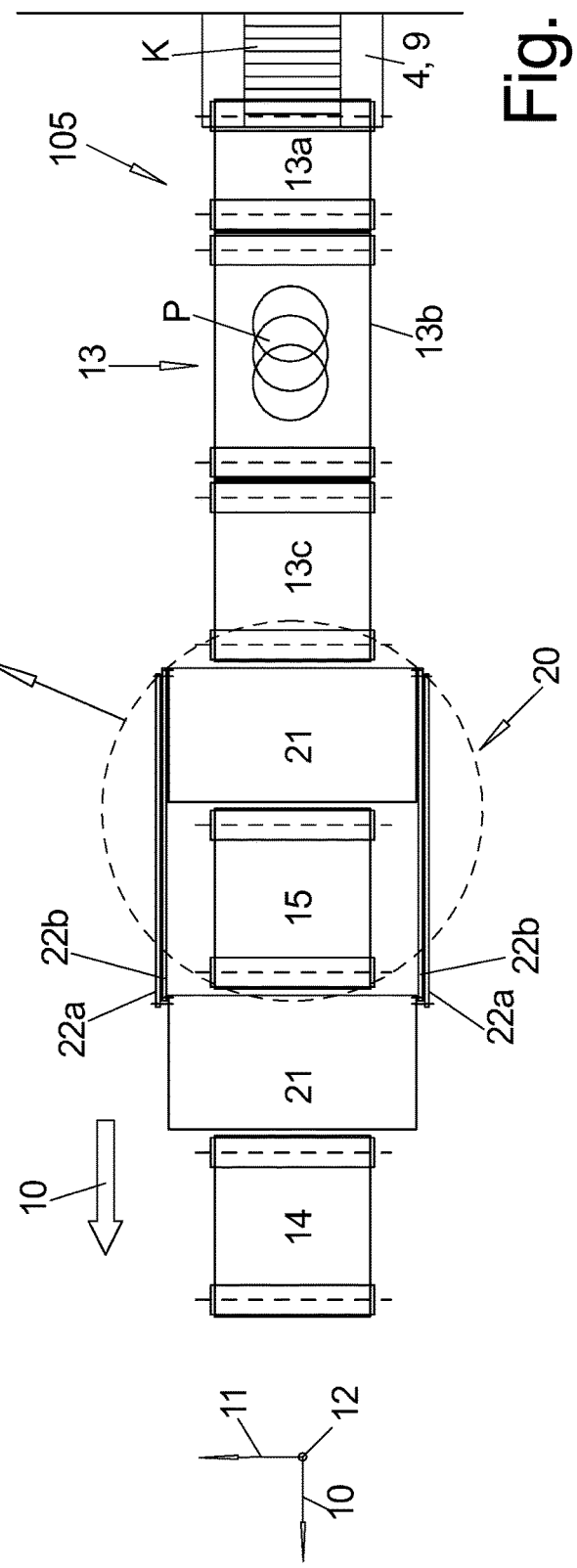

INSERT FEED UNIT AS WELL AS A METHOD FOR ITS OPERATION

CROSS-REFERENCE TO RELATED APPLICATION

This application claims priority to German Patent Application No. DE 102021116619.5 filed on Jun. 28, 2021, the disclosure of which is incorporated in its entirety by reference herein.

TECHNICAL FIELD

The invention relates to a feed unit for feeding weight-checked articles—e.g., individual slices or portions composed of slices—for example from a slicing machine, in particular a slicer, with which in the food industry strands of an only slightly compressible product such as sausage or cheese are sliced, to the e.g., insertion point of a packaging machine.

Although such a feed unit does not necessarily carry out the insertion process into the packaging machine itself, in practice it is called an inserter or insertion line.

BACKGROUND

The insertion feed unit receives the articles, for example, from a slicer—which is referred to exclusively in the following without limiting the invention to this type of slicing machine—which generally includes a discharge unit, which can then be the load unit to the insertion feed unit and delivers the articles in single or multiple lanes.

It is known to provide a buffer within a feed unit for the produced slices or in particular portions, which often have a large space requirement, such as buffer belts arranged horizontally one above the other, for example according to DE 10 2014 117 392 A1, which also does not allow random access to each of the slices held on such a buffer belt.

SUMMARY

It is therefore the object according to the invention to provide an insertion feed unit as well as an insertion supply unit—consisting of a slicing machine such as a slicer as well as an insertion feed unit—as well as a method for their operation, which allows a short construction form of the insertion feed unit.

A feed unit for insertion—referred to in the jargon as an insertion unit—typically comprises a load unit for the delivered articles and a unload unit for transferring the delivered articles in the passage direction, as well as a buffer in between, in which the articles can be temporarily stored in order to be able to compensate as flexibly as possible for example for the different high operating speeds of the upstream and downstream operating units or to be flexible when assembling portions in particular.

It is known that at least one of the several successive belts transferring the articles to one another in the insertion feed unit, preferably upstream of the buffer, is embodied as a weighing belt in order to be able to weigh the article lying on it. A different design of a weighing station than the design of one of the belts as a weighing belt is also possible.

Downstream of such a weighing station, there is often a turn-out in the buffer section for diverting articles of incorrect weight from the main conveyor line to a secondary conveyor line, in particular a wastage line.

According to the invention, the buffer is embodied as a paternoster buffer circulating in a vertical plane, in which the individual buffer elements—on each of which an article can be deposited and which are usually plate-shaped—are attached to at least two ring-shaped, synchronously driven, vertically circulating, curve-capable ties such as a strap or a chain, so that the buffer elements can also circulate in a controlled manner in a vertical circulation plane by means of this drive. A control system regulates the movements of the paternoster buffer, among other things.

This results in a very short insertion feed unit with which the first-in-first-out principle can also be implemented without any problems, especially if the conveyors, which are usually in the form of conveyor belts, can perform several functions, for example if at least one conveyor each of the load unit and the unload unit to/from the paternoster buffer is embodied as a weighing belt on the one hand and is capable of discharging wastage articles on the other, but can also remove an article from a buffer element of the paternoster buffer or deposit it on the latter.

The need for overall length is also reduced by the fact that the deposit positions in the paternoster buffer are arranged one above the other and are not arranged one behind the other as in the case of individual buffer belts arranged one above the other or side by side on the individual buffer belts.

Another advantage is that the removal sequence from the paternoster buffer can be independent of the loading sequence, i.e., the first-in-first-out principle can also be implemented without any problems.

In addition, the entire paternoster can be moved in height, which, with appropriate control, can be used with the rotating wheels of the paternoster in such a way that certain buffer elements, for example those on the infeed side, remain unchanged in their height, but nevertheless a specific buffer element on the outfeed side can be set at the height of the unload unit and from there a product can be removed from the buffer.

Preferably, the buffer elements or a part of each buffer element can also be detachably and during operation automatically detachably and couplably attached to the at least one tie of the paternoster, whereby the amount of buffer elements can be increased without increasing the circulating tie elements of the paternoster and thus further increasing the space requirement at least in the vertical direction.

In this way, the insertion feed unit can be used even more flexibly.

The upward movement of the buffer elements can be effected by a different drive than their downward movement.

Preferably, the upward movement is effected by means of a paternoster as described above.

The working movement can be effected by means of another paternoster and transfer of the buffer elements in between.

However, the structural complexity can be greatly reduced, and additionally the storage capacity can be increased, by allowing buffer elements detached from the tie of the paternoster to be moved downward in a guide by gravity, preferably in a timed manner.

Preferably, the paternoster buffer is embodied in such a way that it can nevertheless be passed through the buffer by an article without intermediate buffering, i.e., also in particular without being deposited on a buffer element, by passing an article directly from the load unit to the unload unit, i.e., without using the paternoster buffer, but preferably through it.

In particular, viewed from the circulation plane, an internal conveyor is arranged inside the paternoster, i.e., between the infeed run—the vertical run of the circulating tie, which is adjacent to the load unit—and the outfeed run—the vertical run of the circulating tie, which is adjacent to the unload unit—which can take over an article lying on the infeed run—provided that the corresponding tie is brought to the height of the internal conveyor—and pass it on to a buffer element of the outfeed unit.

Preferably, the buffer elements are simple depositing surfaces, e.g., depositing plates, which do not themselves contain any transport device—neither pusher nor conveyor belt design.

For the transfer from one buffer element to an adjacent conveyor or vice versa, one of the two must thus be brought into the effective range of the other.

This can be done by extending the buffer element in and against the conveying direction or by extending one of the adjacent conveyors—be it the adjacent conveyor of the load unit or the internal conveyor or the adjacent conveyor of the unload unit—into the operating range of the buffer element.

The internal conveyor should therefore preferably be able to extend its upstream deflection drum into the area of action of the infeed trough, but also to extend its downstream deflection roller or deflection drum into the area of the discharge trough of the paternoster buffer.

One possibility for transferring an article from a buffer element without its own conveyor device, such as a deposit plate, to an adjacent conveyor is for the buffer element, in particular the deposit plate, to have an element base body from which a number of tines project parallel to one another in the transverse direction.

Preferably, only the base body of the element is connected to the rotating ties.

For entry into the spaces between the tines, the conveyor cooperating therewith can be constructed in such a way that it does not consist of a circulating, wide conveyor belt, but of several conveyor straps circulating side by side in the transverse direction, which on one side—preferably the side facing away from the paternoster buffer—circulate over a deflection drum common to all conveyor belts, while at the other end in the conveying direction, preferably the end close to the paternoster buffer, each belt runs over its own deflection roller and this deflection roller is mounted in supporting struts running in the conveying direction, which are fastened to the base frame of this conveyor, usually at the end of the continuous deflection roller.

By moving the deflection rollers—usually only together—in a controlled manner along these supporting struts in and against the conveying direction, the individual straps of such a belt conveyor can enter the spaces between the tines of the depositing plate of the buffer element.

Depending on whether the upper side of the conveyor belts or the upper side of the tines is higher, the article rests on one or the other of the two and can be transferred from one element to the other by relative movement between these two elements in the vertical.

It does not matter whether the relative movement is performed by the conveyor or by the paternoster buffer, whereby of course the paternoster buffer preferably has a vertical movement capability with corresponding drive anyway.

In this way, a transfer from an adjacent conveyor or the internal conveyor to buffer elements of the paternoster is possible with limited effort, even if the paternoster does not have its own conveying means along its support surface.

In another embodiment, there can be no intermediate conveyor into the conveyor between the inlet run and the outlet run, but the buffer elements can be very close to each other in the conveying direction. The adjacent conveyors of the load unit and the unload unit must then be able to be extended so far into and over the center of the paternoster buffer that they can also carry out a direct transfer of an article to or from a buffer element on the remote run.

If the feed unit is of multi-track design—in particular because the load unit is already of multi-track design—the feed unit preferably comprises a track distributor or track spreader, in particular embodied as a track spreader belt, in order to bring the individual tracks to the correct transverse spacing for a subsequent machine, or also in order to create sufficient transverse spacing between the individual tracks if a paternoster buffer is present in each track, which often has a greater width than the load unit or the unload unit, since the circulating tie elements carrying the buffer elements engage outside on the buffer elements in the transverse direction and these buffer elements, however, have at least the width of the adjacent conveyors, and the adjacent conveyors should be able to enter the paternoster buffer with their entire width.

Especially when the buffer is used to assemble weight-accurate portions from several slices as articles, a scale will be arranged upstream of the buffer, preferably present in each track, but preferably downstream of the track distributor, since there is more space available for the arrangement of a scale, also within a weighing belt.

In particular, such a weighing belt can be part of the insertion feed unit and thus require no additional length for an additional conveyor.

Since the multiple transfers also from and to the buffer can cause inaccuracies in the deposit position, the insertion feed unit can have, preferably as far as possible at its downstream end, an alignment belt for aligning the position and/or rotational position of the article on the one hand parallel to the direction of travel and/or on the other hand with respect to the desired transverse position. Preferably, the alignment belt will be part of the discharge unit.

Both unload unit and load unit, especially the former, often consist of several individual conveyors arranged one behind the other in the conveying direction.

With regard to an infeed supply unit—consisting of a slicing machine such as a slicer and a downstream insertion feed unit—according to the invention, the insertion feed unit is embodied as described above.

This achieves the advantages described for the entire insertion supply unit.

The slicing machine, in particular the slicer, generally comprises:
  a cutting unit for cutting off slices,
  a feeding unit for feeding the product caliber to the slicing unit and
  a discharge unit for the separated slices, which is usually also capable of combining several slices into a portion and depositing them on the discharge conveyor, in particular partially overlapping one another.

The discharge conveyor unit of the slicing machine can—at least partially—already be the load unit for the insertion feed unit.

Preferably, the weighing belt is an discharge conveyor of the discharge unit of the slicing machine, so as not to cause any additional overall length.

Preferably, the unload unit of the insertion feed unit, i.e., the inserter, leads to the insertion point in a packaging element such as a packaging cavity.

In a method of operating an insertion feed unit, the above object is solved in that the article, in particular a single slice or a portion, is either transferred directly and without buffering to the unload unit and discharged, or is initially transferred to the buffer, where it is temporarily stored, and transferred to the unload unit or the interior conveyor as required.

This makes the entire unit very flexible in use.

Preferably, a buffer element of the inlet trough is positioned in the height position independent of the height position of the outlet trough or in particular of a special buffer element of the outlet run of the paternoster buffer. This allows the two sides of the paternoster to operate substantially independently of each other, i.e., to be filled or emptied.

Further, articles can be removed at multiple discharge points of the same run, i.e., inlet run or outlet run, of the paternoster buffer, for which purpose additional adjacent conveyors generally must be provided there and/or an additional interior conveyor must be provided.

This can speed up the filling and emptying of the paternoster.

In addition, sorting and/or diverting of wastage articles can occur away from the buffer, or can occur out of the buffer.

Weighing can take place at several positions spaced apart in the passage direction, especially for the individual tracks. This prevents mutual interference between the scales used.

Furthermore, the buffer can be used to sort articles, in particular slices, according to certain parameters, in particular weight, and in this way, with the help of the buffer, weight-accurate portions can be assembled in the buffer or downstream.

BRIEF DESCRIPTION OF THE DRAWINGS

Embodiments according to the invention are described in more detail below by way of examples. They show:

FIG. 1b: a top view of the insertion feed unit according to FIG. 1a, FIG. 1c: an enlargement of FIG. 1b, FIG. 2: a top view of a multi-track insertion feed unit.

DETAILED DESCRIPTION

Figure 1A:
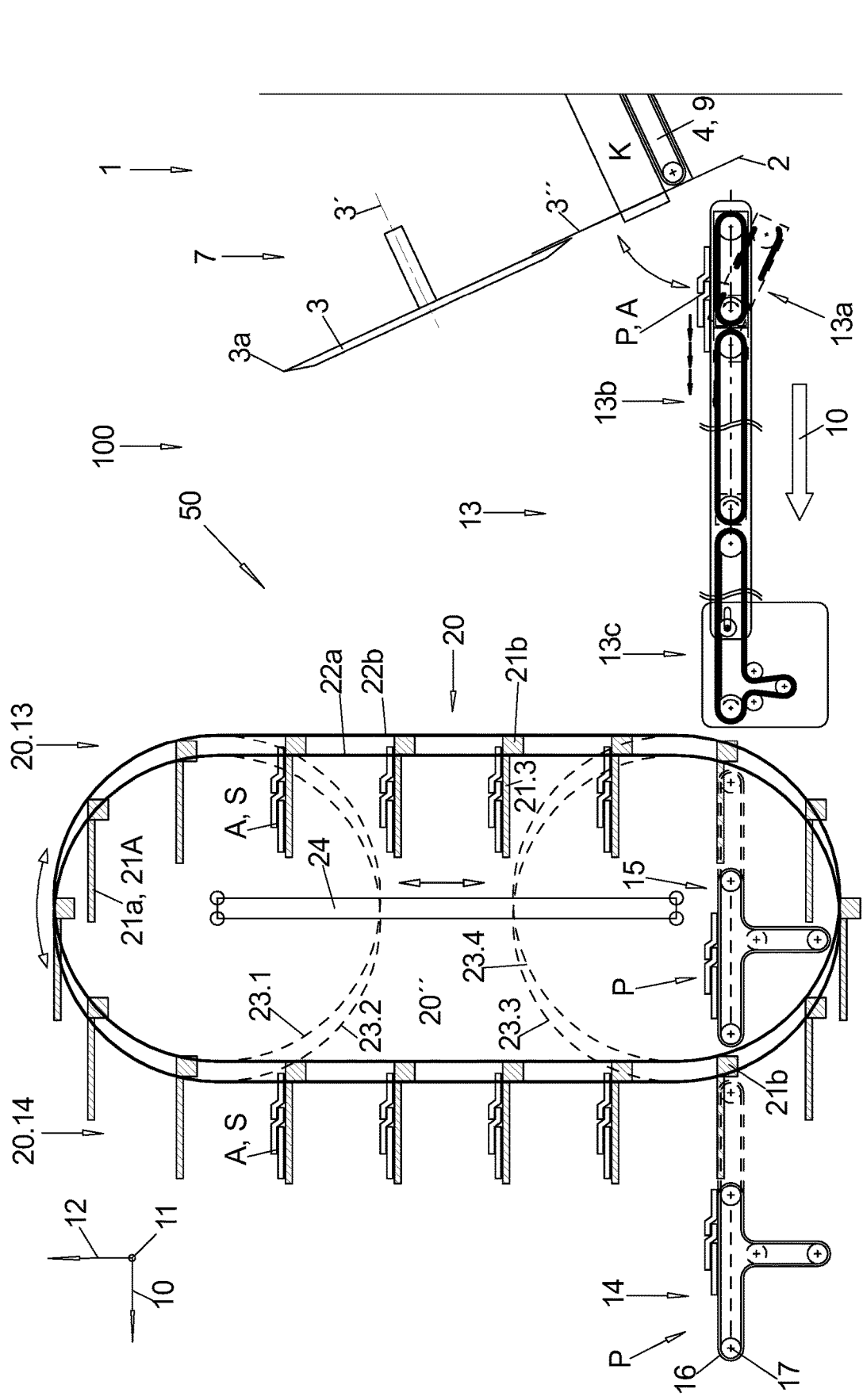
FIG. 1a: a first design of an insertion feed unit according to the invention in side view.

FIGS. 1a and 1b show in side view and top view a first design of a feed unit with a paternoster buffer 20 as the core element as well as a load unit 13 and an unload unit 14, which transport an article A such as a single slice S or a portion P consisting of several slices S to and from the buffer 20.

At the right edge of the picture a slicing machine 1 is still shown, from which the slices S are cut off with the help of a cutting unit 7, which has a blade 3 rotating around a blade axis 3' with a cutting edge 3a at the circumference, which can be moved back and forth along a cutting plane 3" and can cut off slices from a caliber K transported obliquely downwards forwards on a product support 4 or a lower driven product guide 9.

The sliced slices S fall onto the discharge conveyor 13 of the slicing machine 1, so that both together, i.e., slicing machine 1 and inserter 50, form a feeder supply unit 100, which can supply a downstream packaging line with articles A such as slices S.

In FIGS. 1a, b, c, the passage direction of the products, i.e., the conveying direction, is from right to left and is indicated by 10.

As can be seen, the discharge unit 13 of the slicing machine 1 comprises several individual conveyors 13a to 13c in succession in the passage direction, the height position and their pivoting position of the 1st conveyor in particular, the so-called portioning belt 13a, being adjustable in many ways relative to the rest of the slicing machine.

The load unit for the paternoster buffer 20 is thus essentially the last conveyor 13c in front of it in the conveying direction 10, since this conveyor effects the transfer to the buffer 20.

The paternoster 20 carries a series of buffer elements 21, for example 21.3, which are essentially plate-shaped and serve as a deposit surface, for example a deposit plate, for an article A to be deposited thereon.

As FIG. 1b shows, the buffer elements 21 are normally not closed plate-shaped, as shown in the overview representation of FIG. 1b, but have, according to FIG. 1c, a plurality of tines 21a running side by side at a distance from one another in the conveying direction 10 or in opposite directions, which are connected at one end to form a tine plate 21A or are fastened individually to a base body 21b or merge integrally into the latter and end freely at the other end, preferably pointing in the conveying direction 10.

As is usual in a paternoster, the individual moving elements are attached to at least two annularly revolving ties 22a, 22b as a drive, the attachment here preferably being only to the base bodies 21b.

Figure 3:
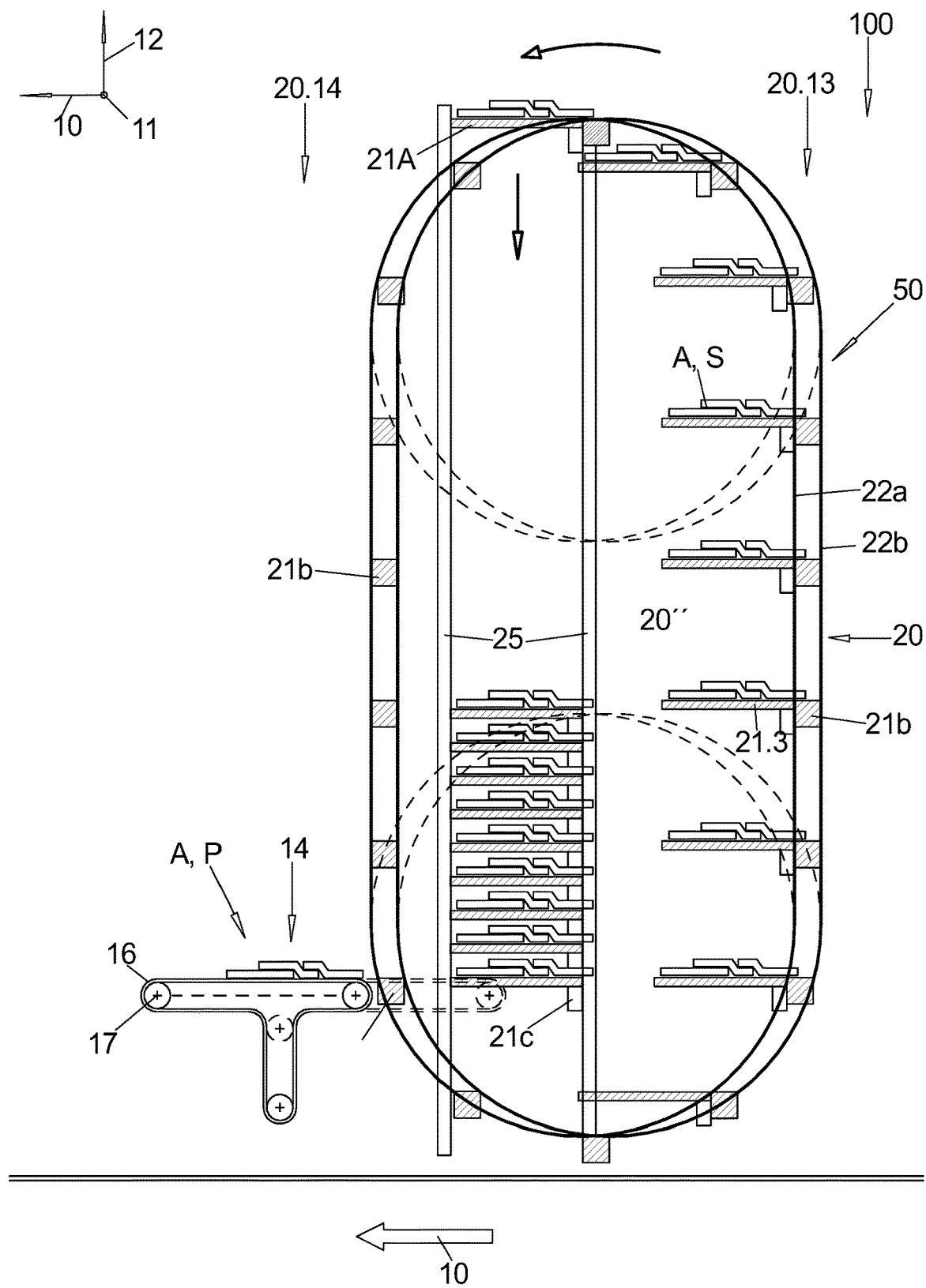
FIG. 3: a second embodiment of a insertion feed unit according to the invention in side view.

This facilitates the uncoupling of the rest of each buffer element 21, in particular the tine plate 21A from the base body 21b, as indicated in the enlargement of the figure as well as shown in FIG. 3.

Since the free ends of the tines 21a point, for example, in the conveying direction 10, the buffer elements 21, which are currently located in the inlet run 20.13 facing the load unit 13, protrude into the interior space—in side view—of the paternoster 20 circled by the ties 22a, b, on the other side away from the outlet run 22.14 in the conveying direction 10.

The distance of the buffer elements 21 along the tie elements 22a, b is mainly determined by the fact that the buffer elements 21 must not reach each other even in the upper and lower reversal area of the paternoster 20.

A control system not shown controls not only the circulation of the paternoster 20, but also its height adjustment, because the deflection wheels 23.1, 23.2, around which the two endless tie elements 22a, b circulate at the top and bottom, are attached to a common support frame 24, which can be moved up and down in a controlled manner.

This allows the height position of a buffer element 21 in one run to be adjusted independently of the method of moving the buffer elements in the other run.

Since the load unit 13 and the unload unit 14 are usually positioned with their upper support surfaces at a predetermined height above the ground, usually the working height, this usually also defines the height position at which articles A are transferred to and from the paternoster 20.

In order to keep the paternoster 20 simple, the individual buffer elements 21 do not have any conveying devices such as sliders or an embodiment as a conveyor belt with which they can pull an article lying on them over to them or push them off them.

For this reason, at the transfer height—preferably the load unit 13 and the unload unit 14 are at the same height with their upper support surfaces—there is, for example, an internal conveyor 15 which can take over an article A both from the infeed run 20.13 and from the discharge run 20.14 from a buffer element 21 arranged at the corresponding height and can also deliver it to the latter.

As can be seen from the top view of FIG. 1b, in the transverse direction 11, the plate-shaped buffer elements 21 are wider than the infeed and outfeed conveyors, since the latter must be able to enter between the lateral ends of the buffer elements 21, to which—see FIG. 1b—they are attached to the rotating tie elements 22a, b. The buffer elements 21 are also wider than the outfeed conveyors.

This is because the enlargement of FIG. 1c shows how, despite the vertically movable buffer elements 21, a conveyor, such as the internal conveyor 15 or the unload conveyor 14, can transfer to each other an article A lying on it and extending over several of the tines 21a.

For this purpose, the conveyor—seen in plan view on the side with the free ends of the tines 21a—arranged, in this case the internal conveyor 15, is not embodied as a belt conveyor with a conveyor belt running over the entire width in transverse direction 11, but as a strap conveyor with several conveyor straps 16 circulating next to each other in vertical planes in transverse direction 11.

These belts circulate over a common deflection drum 17, i.e., over all the straps 16 in the transverse direction 11, at their end facing away from the buffer element 21, and are generally also driven by this continuous deflection drum 17.

At the end near the buffer, however, each strap 16 revolves via its own separate deflection roller 18, which is narrow when viewed from above and is fastened to the base frame of this conveyor, in which the continuous deflection drum 17 is also mounted, by means of a supporting strut, which is not shown and also extends in the conveying direction 10.

In this case, the buffer-side unit consisting of deflection roller 18, strap 16 and, if applicable, supporting strut is still narrower than the distance between two adjacent tines 21a, as seen in plan view, so that they can be accommodated in the intermediate space between them, as shown in the enlargement of FIG. 1c at the three tine spacings shown in the figure below.

Whether the entire conveyor 14, 15 or only its deflection rollers 18 are moved in the direction of the buffer element 21 and move in between the tines 21a is irrelevant.

A loading process of the buffer 20 would therefore take place in such a way that, according to the enlargement in FIG. 1b, the individual deflection rollers 18 and the straps 16 guided around them are located in the distances between the tines 21a, pushed in as far as possible between the tines 21a and with the upper side of the upper run of the straps 16 lying somewhat higher than the upper side of the buffer element 21.

Then, by means of the load unit, in this case the conveyor 13c, an article can be pushed forward over its front end in the conveying direction 10, over the base body 21b, which is relatively narrow in this direction, and onto the conveyor belts 16, which are driven in the conveying direction 10, preferably synchronously with the discharge conveyor 13c, and pull the article A at least completely over onto the buffer element 21.

Once this has been done, the buffer element 21 can be moved upwards relative to the conveyor belts 16, thereby lifting the product A off the conveyor belts 16, which then only rests on the tines 21a if the article A is to be temporarily stored in the buffer 20.

If, on the other hand, it is only to be passed through the buffer 20, essentially horizontally, without being temporarily stored, the buffer element 21 is not lifted and the belts 16 continue to be driven so that the article A is transported further beyond the front end of the intermediate conveyor 15 in the conveying direction, in this case at the deflection drum 17.

Here, too, the internal conveyor 15 pushes the article A over the base body 21b of this buffer element 21 so that it comes into contact with the upper side of the upper run of the belts 16 of a belt conveyor described in the same way as above, the free-ending straps of which are located between the tines 21a, the upper side of which is positioned somewhat lower than that of the upper run of the belts 16.

Since in this case, too, the straps 16 are driven in the conveying direction, preferably again synchronously with those of the internal conveyor 15, the article A is transferred to the outfeed conveyor 14 and can be forwarded from there to the next station.

However, incoming articles A, in particular individual slices S or portions P or partial portions, are frequently buffered temporarily in buffer 20:

The most common reason for this is that the slicing machine upstream of buffer 20 operates much faster than a downstream packaging machine.

In this case, at least some of the portions produced are temporarily stored in the buffer 20 after slicing and, after slicing of one or more parallel product calibers, i.e., during the time of reloading of the slicing machine, are forwarded from the buffer 20 to the packaging machine.

Another reason for providing a buffer 20 could be to assemble, either on the internal conveyor 15 or only on the unload conveyor 14, portions P that consist of slices S that differ somewhat in weight or other parameters and that only in sum meet a required parameter such as weight.

Thus, in the case of a grown piece of meat, the first and last slices can have a different cross section compared to the slices in the middle section, which cannot be completely ruled out even by cross-pressing to a uniform caliber, and yet a portion P with target weight as indicated in FIG. 1a can be obtained by feeding a slice S with the specific parameter required in each case from the buffer 20 at the right time.

Figure 2:
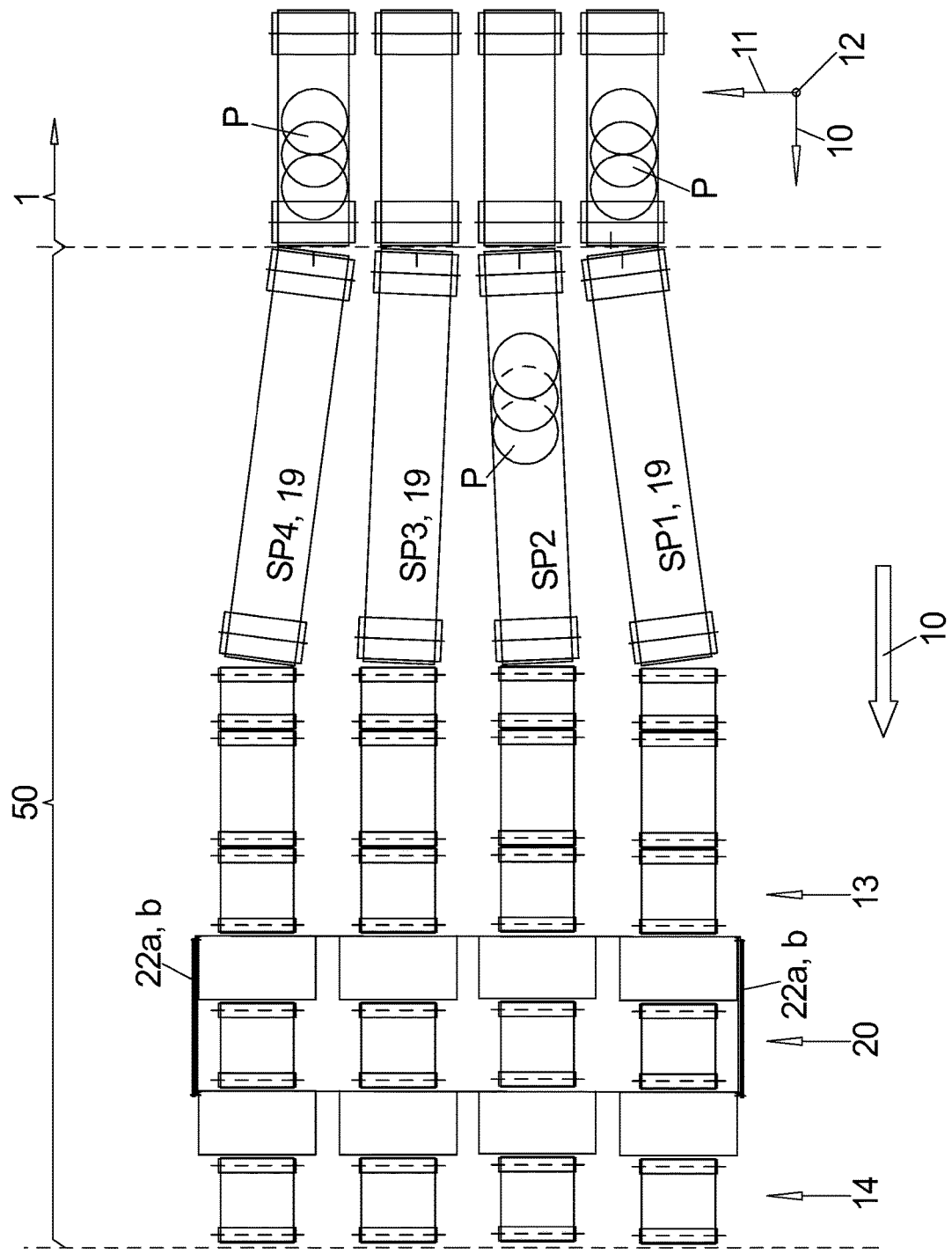

FIG. 2 shows the situation when portions P of the correct weight are to be formed from the slices separated by a multi-track slicing machine 1 and placed on its discharge conveyor unit:

Then, as a rule, spreading belts 19 are used to bring the individual tracks SP1 to SP4 to a greater distance from one another, for example to the distance of a downstream packaging machine, than the distance between the tracks of the slicing machine 1, and then the insertion feed unit 50 is arranged as shown in FIG. 1b.

This applies in particular if a separate, separately drivable paternoster 20 is provided on each track, since in the transverse direction 11 the paternoster buffers 20 must have a greater width than their load unit 13 and unload unit 14.

In practice, however, it is sufficient—as shown in FIG. 2—to have a paternoster 20 that passes over several, preferably all, existing tracks in the transverse direction 11, especially if only synchronous slitting is performed on the individual tracks.

In this case, no feed elements driving the paternoster have to be provided between the tracks, which means the elimination of a boundary condition and thus a simplification in the construction of the entire system.

FIG. 3 shows a second design of an insertion feed unit 50 or of the buffer 20 there, in which the upward movement of the buffer elements 21 on the one hand and their downward movement on the other hand is effected by means of two different drives, for which purpose the buffer elements can be operatively connected to and disconnected from the respective drive, preferably in that the tine plate 21A, in which the tines 21a are formed, can be automatically disconnected and coupled to the base body 21b of the buffer element 21.

The upward movement is performed with the aid of the paternoster 20 and the upward trunk of its endless, driven rotating ties 22a, b. Preferably, the base bodies 21b always remain coupled to these ties 22a, b, and a tine plate 21A can couple to and uncouple from each of the base bodies 21b, preferably automatically.

Preferably, one tine plate 21A is coupled to a base body 21b located at the lowest point of the circulation and—after loading with an article A, in particular a portion P—uncoupled therefrom when the base body 21b is at its preferably highest circulation position.

The downward movement is performed by means of another drive, for example the downward runs of another paternoster, Preferably, however, gravity is used for the downward movement, which is why the loaded tine plates 21A, after uncoupling from the base body 21b, slide downward under the force of gravity in a plate guide 25 directed from top to bottom, preferably vertically, and are kept at a distance in height by means of spacers 21c—which are preferably part of the buffer element 21 and remain attached to the tine plate 21A—so that there is space between them for the article A lying on the lower tine plate 21.

In this case, the lowermost tine plate 21A loaded with an article A of the stack building up in the plate guide 25 is stopped in the downward movement at a height corresponding to the unload unit 14 located next to the paternoster 20, in order to transfer the article A from this tine plate 21A to the unload unit 14, which is preferably done by the unload unit 14 itself.

Subsequently, the now empty tine plate 21 is released in the plate guide 25 so that it can continue to move downward therein and can automatically couple to the base body 21b located at the lower end of the guide 25 and usually at the lowest point of its circulation, which by its further movement along the paternoster 20 takes the now empty tine plate 21 transversely out of the vertical plate guide 25.

Since only a small distance between the tine plates 21A corresponding to the space required by an article A in height must be maintained in the plate guide 25, whereas in the paternoster 20 the vertical distances must be considerably greater because of the otherwise imminent danger of collision between buffer elements 21 located one behind the other in the upper and lower reversal areas, a number of tine plates 21A corresponding to the total number of base bodies 21b circulating in the paternoster 20 can generally be accommodated in the plate guide 25.

If required, the number of tine plates 21A that can be kept in the plate guide 25 is also greater than the number of base bodies 21b circulating in the paternoster 20 that are not currently equipped with a tine plate 21A, which further increases the storage capacity of the buffer 20.

REFERENCE LIST 1 slicing machine, slicer
2 base frame
3 blade
3' rotation axis
3" blade plane, cutting plane
3a cutting edge
4 product support, feed conveyor, feed belt
5 cutting frame
6 stop plate
7 cutting unit
8 upper product guide, upper guide belt
9 bottom product guide, bottom guide belt
10 transport direction, longitudinal direction, axial direction
11 1st transverse direction (width)
12 2nd transverse direction, vertical direction
13 load unit
14 unload unit
15 internal conveyor
16 strap
17 deflection drum
18 deflection drum
19 lane distributor belt
20 buffer, paternoster buffer
20.13 inlet run
20.14 outfeed run
20' circulation plane
21.1/.2 buffer element
21A tine plate
21a tine
21b element base body, base body
21c spacer
22a, b tie
23.1/.2 deflection wheel
24 support frame
25 plate guide
50 insertion feed unit, insertion line
100 insertion supply unit
A article
K product, product caliber
S slice

The invention claimed is:

1. An insertion feed unit comprising:
a load unit;
a buffer; and
an unload unit;
wherein the insertion feed unit is configured to automatically buffer articles delivered by the load unit in the buffer and/or convey the articles by the unload unit in a passage direction,
wherein the buffer comprises a paternoster buffer including
a plurality of buffer elements which are connected to one another via a first drive formed as an annularly closed, curve-capable, drivable tie and are each configured for placing an article thereon, wherein the buffer elements are circulatable in a controlled manner in a vertical circulation plane, and
wherein the insertion feed unit is embodied in such a way that an article can be transferred from the load unit to the unload unit without being temporarily stored in the buffer.

2. The insertion feed unit according to claim 1, wherein the vertical circulation plane extends in the passage direction.

3. The insertion feed unit according to claim 1, wherein at least a respective part of each buffer element is detachably fastened to the tie.

4. The insertion feed unit according to claim 3, wherein the parts of the buffer elements comprise tine plates that can be moved upwardly and/or downwardly by a second drive when the parts are detached from the tie.

5. The insertion feed unit according to claim 3, wherein the buffer further comprises a plate guide, and wherein the parts of the buffer elements, when released from the tie of the paternoster buffer, can be moved downwards by means of gravity in the plate guide.

6. The insertion feed unit according to claim 3, wherein the buffer further comprises an additional paternoster buffer, and wherein the parts of the buffer elements, when released from the tie of the paternoster buffer, can be moved upward and/or downward coupled to and by the additional paternoster buffer.

7. The insertion feed unit according to claim 1, wherein an internal conveyor is arranged in an interior of the paternoster buffer at a level aligned with a support surface of the load unit and/or the unload unit.

8. The insertion feed unit according to claim 1, wherein the buffer elements each have an element base body and a tine projecting in or against a conveying direction on one side of the element base body, and
the element base bodies are connected to the tie at spaced-apart fastening points.

9. The insertion feed unit according to claim 1, wherein the buffer includes an additional tie, and the two ties engage in a transverse direction on each side of each buffer element.

10. The insertion feed unit according to claim 1, wherein the unload unit comprises a conveyor having a plurality of individual straps which are spaced apart in a transverse direction and are circulatable next to one another in circulation planes,
the straps are each configured to turn around a common deflection drum at a downstream end,
an upstream end of each strap is configured to turn around a respective separate deflection roller which is narrower in the transverse direction than the deflection drum, and the deflection rollers are spaced apart from one another in the transverse direction, and
each deflection roller and the respective strap are narrow enough to be inserted between two tines of one of the buffer elements when viewed from above.

11. The insertion feed unit according to claim 10, wherein the deflection rollers can be displaced in and against a conveying direction in a controlled manner.

12. The insertion feed unit according to claim 1, wherein the paternoster buffer can be moved in height in a controlled manner, and
rotation speed of the paternoster buffer is controllable when the paternoster buffer is moved in height in such a way that one or some buffer elements maintain their position.

13. An insertion supply unit comprising:
a single-track or multi-track slicing machine for cutting slices from a product caliber, comprising:
a cutting unit for cutting slices,
a product support for feeding the caliber to the cutting unit, and
a discharge unit for the slices, which is also capable of placing several slices at least partially on top of each other to form a portion, and
an insertion feed unit arranged downstream of the cutting unit in a passage direction, the insertion feed unit comprising:
a load unit;
a buffer; and
an unload unit;
wherein the insertion feed unit is configured to automatically buffer articles delivered by the load unit in the buffer and/or convey the articles by the unload unit in the passage direction,
wherein the buffer comprises a paternoster buffer including a plurality of buffer elements which are connected to one another via a first drive formed as an annularly closed, curve-capable, drivable tie and are each configured for placing an article thereon, and wherein the buffer elements are circulatable in a controlled manner in a vertical circulation plane.

14. The insertion supply unit according to claim 13, wherein the discharge unit of the slicing machine comprises the load unit of the insertion feed unit.

15. The insertion supply unit according to claim 13, wherein the discharge unit of the slicing machine comprises a discharge conveyor including a weighing belt.

16. The insertion supply unit according to claim 13, wherein the load unit of the insertion feed unit comprises a conveyor including a weighing belt.

17. The insertion supply unit according to claim 13, wherein the unload unit leads to an insertion point for a packaging cavity.

18. A method of operating an insertion feed unit including a load unit, a buffer, and an unload unit, wherein the insertion feed unit is operable to automatically buffer articles delivered by the load unit in the buffer and/or convey the articles by the unload unit in a passage direction, wherein the buffer is embodied as a paternoster buffer having a plurality of buffer elements which are connected to one another via a first drive formed as an annularly closed, curve-capable, driven tie and are each configured to receive an article thereon, wherein the buffer elements are circulatable in a controlled manner in a vertical circulation plane, and wherein the method comprises:
feeding an article by the load unit and either transferring the article without buffering to the unload unit and discharging the article, or transferring the article to the buffer and, when required, transferring the article from the buffer to the unload unit.

19. The method according to claim 18, wherein
a buffer element is positioned at a discharge point essentially independently of whether and which buffer element is located at a pick-up point or vice versa and/or articles can be removed from the buffer at several discharge points.

* * * * *